(12) United States Patent
Zimin, Sr. et al.

(10) Patent No.: US 6,666,897 B2
(45) Date of Patent: Dec. 23, 2003

(54) BLACK ALCOHOL SOLUBLE DYE FORMULATION

(76) Inventors: Alejandro Zimin, Sr., 63 Atwood Pl., Wayne, NJ (US) 07470; Michael R. Friswell, 16 Eldorado Dr., Wayne, NJ (US) 07470

( * ) Notice: Subject to any disclaimer, the term of this patent is extended or adjusted under 35 U.S.C. 154(b) by 183 days.

(21) Appl. No.: 09/731,559

(22) Filed: Dec. 7, 2000

(65) Prior Publication Data

US 2002/0104173 A1 Aug. 8, 2002

Related U.S. Application Data

(60) Provisional application No. 60/172,916, filed on Dec. 21, 1999.

(51) Int. Cl.$^7$ .......................... C09B 67/00; C09B 67/22
(52) U.S. Cl. .................. 8/611; 8/580; 8/638; 8/644; 8/938; 106/31.01
(58) Field of Search .............. 8/611, 638, 639, 8/938, 580, 644; 106/31.01

(56) References Cited

U.S. PATENT DOCUMENTS

| | | | | |
|---|---|---|---|---|
| 4,100,087 A | * | 7/1978 | Takayama et al. | |
| 4,842,646 A | * | 6/1989 | Gamblin | |
| 5,292,593 A | * | 3/1994 | Talvalkar et al. | |
| 5,707,405 A | | 1/1998 | Caputo et al. | .................. 8/527 |

* cited by examiner

*Primary Examiner*—Margaret Einsmann
(74) *Attorney, Agent, or Firm*—Summa & Allan, P.A.

(57) ABSTRACT

The present invention relates to black alcohol soluble dye formulations of high color intensity, low viscosity, and high tinctorial strength. The formulations are particularly useful for writing instruments such as felt tip and roller ball pens.

17 Claims, No Drawings

BLACK ALCOHOL SOLUBLE DYE FORMULATION

CROSS REFERENCE TO RELATED PATENT APPLICATIONS

This is a non-provisional application of prior, now abandoned U.S. provisional application Ser. No. 60/172,916 filed Dec. 21, 1999.

The present invention relates to black alcohol soluble dye formulations of high color intensity, low viscosity, and high tinctorial strength. The formulations are particularly useful for writing instruments such as felt tip and roller ball pens.

Inks formulated for use in writing instruments, as well as other printing applications such as ink jet printing, must be very fluid, stable, and free of any particles that could cause clogging of the instrument. In addition, such inks must be capable of depositing and adhering to the writing or printing substrate with a minimum of character blurring, must be fast drying, and should be permanent with respect to exposure to water. Such inks are generally formulated with soluble dye colorants in a compatible aqueous or solvent-based vehicle to form fluid, particle-free, dye solutions. Non-aqueous inks have advantages over aqueous-based inks since many solvent dyes have reasonable solubility in volatile organic solvents and, as a result, can be applied as true liquid solutions free of any particles. Another benefit of using solvent dyes in inks is that they tend to be permanent, at least with respect to exposure to water.

Writing instrument manufacturers often utilize solvent soluble inks for use as the color component for their finished ink formulations. Typically, such inks are a mixture or blend of a number of basic and/or solvent dyes. Black ink formulations are often customized to individual manufacturers' requirements to provide a multitude of shade variations from greyish to bluish black to convey company recognition by shade variations of the finished ink. This associates their pens to the end user. As a result, black dye formulations are typically blends of yellowish-brown dyes combined with black, violet, and/or blue dyes in widely varying ratios to achieve such shade variations.

The color component of any ink formulation is the controlling factor technically as well as economically. Stringent performance criteria, including light fastness, viscosity, surface tension, write out, etc., tend to limit the available choices for ink components, particularly the colorant. For these reasons, there is always a need in the industry for ink formulations which meet or exceed performance standards demanded by the industry and yet are more economical to use than those currently available.

We have discovered a black, solvent based dye formulation in which the amount of standard yellow-brown component is greatly reduced and yet which provides reduced formulation viscosity, increased tinctorial value without increasing the amount of colorant in the final ink formulation, allows inclusion of other dyes to modify the color and other solvents and co-solvents, and yet is more economical for the user.

The present invention, therefore, provides a black, alcohol soluble dye formulation composition comprising:

a) from 20 to 45 percent, preferably 30 to 45 percent, more preferably 39 to 41 percent, of a propanol solvent selected from n-propanol, isopropanol, or a mixture thereof;

b) from 30 to 35 percent, preferably 32 to 34 percent, more preferably 32 to 33 percent, of Nigrosine Base;

c) from 20 to 40 percent, preferably 23 to 35 percent, more preferably 23 to 26 percent, of one or more ($C_7$–$C_{20}$), preferably ($C_8$–$C_{18}$), more preferably ($C_8$–$C_{10}$), most preferably ($C_8$) straight or branched chain, saturated or unsaturated carboxylic acids, d) from 1 to 6 percent, preferably 2 to 5 percent, more preferably 2 to 3 percent, of a brown or yellow dye or combination thereof; and e) from 1 to 3 percent, preferably 1 to 1.5 percent, more preferably 1 percent, of Crystal Violet Base, Methyl Violet Base, or mixture thereof; and f) optionally, 0 to 5 percent, preferably 0 to 1 percent, of an ester cosolvent.

Unless otherwise specified herein, all percentages, parts, and ratios are by weight; are inclusive, and are combinable. All temperatures are in degrees Celcius and all temperature ranges are inclusive and combinable.

Preferably, the composition consists essentially of those components specified above. Preferably, the propanol solvent is n-propanol. Preferably, the carboxylic acid is 2-ethylhexanoic acid. Preferably the brown or yellow dye is selected from C.I. Solvent Brown 12 dye or a yellow dye of the formula:

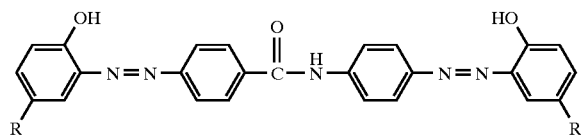

as disclosed in U.S. Pat. No. 5,142,030, incorporated by reference herein, wherein each R is independently a ($C_6$–$C_{12}$)alkyl; preferably each R is a nonyl group (the xylene solution of which is available as Automate™ Yellow D dye from Morton International or Rohm and Haas Company), or a mixture thereof, most preferably the brown or yellow dye is C.I. Solvent Brown 12 dye. When used, the ester cosolvent is preferably an acetate, more preferably n-propyl acetate or ethyl acetate. Such cosolvents are most useful when the formulation is intended to be applied to a non-porous substrate.

The black solvent based formulations of this invention have high tinctorial strength. That is, these formulations have high spectral strength relative to their colorant concentrations. High tinctorial strength is important for certain applications such as ink jet printing. In addition, the compositions are highly fluid, that is, the viscosity is preferably less than 1200 centipoise (cP) at 25° C., more preferably less than 1000 cP, and essentially free of particles that can clog the dispensing tips of felt-tip and roller-ball pens as well as ink-jet printer heads. Also, when dried, the ink residue is permanent with respect to exposure to water but is resoluble with respect to its own solvent carriers. This prevents caking (drying) of the ink in the dispensing tips of felt-tip and roller-ball pens between uses. The inks are further capable of depositing and adhering to the printing substrate, preferably a porous substrate such as, for example, paper, cardstock, and corrugated cardboard, with a minimum of character fogging or bleeding and are fast drying without streaking and blotting on the substrate. In addition to use in writing instruments and ink-jet printers, the formulations of this invention may also be useful as wood stains, petroleum colorants, decorative coatings, and printing inks for the graphic arts industry.

Nigrosine dyes are a well-known class of black solvent dyes. The present invention concerns the use of solvent-soluble nigrosine dyes that are insoluble in water. Although there are water-soluble nigrosine dyes, particularly sulfonated nigrosines, this invention is not directed to their use. Water-soluble nigrosine dyes typically remain water-soluble in use and, therefore, can be washed away. Nigrosine dyes are obtained by heating nitro compounds, such as nitrobenzene or nitrophenols, with aniline and/or aniline hydrochloride in the presence of iron or ferric chloride. Different grades or types of nigrosine can readily be prepared by altering the proportions of the reactants and time of heating. The nigrosine compositions obtained from such processes are mixtures of compounds which, in their simplest form are of the formula:

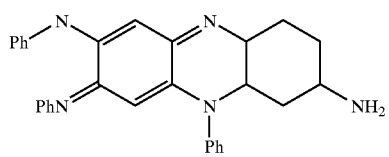

Examples of commercially available nigrosine dyes include Solvent Black 5 and the free base form of Solvent Black 7 ("Nigrosine Base"):

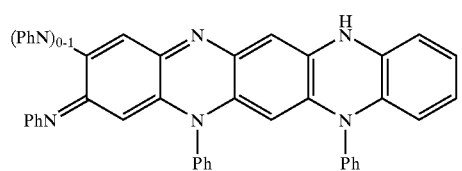
C.I. Solvent Black 5

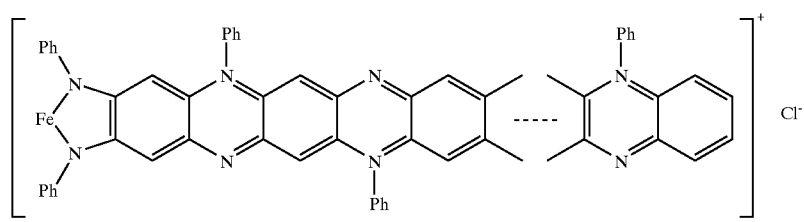
C.I. Solvent Black 7

Nigrosine Base is prepared by reaction of nigrosine dyes with mild alkalis, resulting in rearrangement.

Crystal Violet Base (C.I. Solvent Violet 9) and Methyl Violet Base (C.I. Solvent Violet 8) are classified as basic dye derivatives of pararosaniline, a triphenylmethane type dye. Solvent Brown 12 is a diazo dye mixture prepared by treatment of three parts of toluene-2,4-diamine hydrochloride with two parts of nitrous acid. Crystal Violet Base is preferred. Automate™ Yellow D is a yellow dye prepared by tetrazo coupling of 4,4'-diaminobenzanilide with 2 equivalents of p-nonyl phenol according to the procedure of U.S. Pat. No. 5,142,030, incorporated by reference herein.

Variations in the shade of black obtained with the formulations of this invention can be accomplished by varying the relative amounts of Nigrosine Base, the brown or yellow dye, and the Crystal or Methyl Violet Base.

In addition to the ingredients noted above, the compositions of this invention may include other common ink additives such as, for example, pH adjusters, rheology modifiers, antioxidants, thixotropic agents, plasticizers, conductive agents, cap-off additives, and other pigments and/or dyes (to vary the shade of black obtained).

The compositions of this invention are prepared using the following general procedure:

a) add the Nigrosine Base in portions to the propanol, which has preferably been heated to from 50 to 60° C., with agitation, until complete wetting out of the Nigrosine Base;

b) once all the Nigrosine Base is added, add the carboxylic acid, again preferably maintaining the temperature of the mixture at from 50 to 60° C.;

c) add the brown or yellow dye and the Crystal or Methyl Violet Base, or mixture thereof;

d) heat the mixture to a temperature of from 80 to 85° C. for approximately one hour;

e) cool the mixture, preferably to a temperature of from 50 to 60° C.;

f) optionally, adjust the concentration with additional propanol; and g) optionally, filter the mixture, preferably through a 5μ filter, to remove any particulate materials.

Some embodiments of this invention are illustrated in the following examples which were prepared according to the general procedure outlined

| Ex. # | n-Pr* | Cosolvent | Nigrosine Base* | 2-EHA* | Solvent Brown 12* | Crystal Violet Base* | Visc. |
|---|---|---|---|---|---|---|---|
| 1 | 41 | | 32 | 23 | 3 | 1 | 1100–1140 |
| 2 | 41 | | 33 | 23 | 2 | 1 | 875 |
| 3 | 27 | | 32 | 35[a] | 5[b] | 1 | — |
| 4 | 25 | | 32 | 35 | 5[b] | 3 | — |
| 5 | 34 | 5[c] | 33 | 23 | 4 | 1 | — |
| 6 | 39.5 | | 32 | 23 | 4 | 1.5 | — |
| 7 | 39 | | 32.5 | 25 | 2 | 1.5 | 594 |
| 8 | 40 | | 32 | 23 | 4 | 1 | 2350 |
| 9 | 40 | | 32 | 25 | 2 | 1 | 922 |
| 10 | 35 | | 34 | 26 | 4 | 1 | 4340 |
| 11 | 30 | | 35 | 32 | 2 | 1 | 4310 |

-continued

| Ex. # | n-Pr* | Cosolvent | Nigrosine Base* | 2-EHA* | Solvent Brown 12* | Crystal Violet Base* | Visc. |
|---|---|---|---|---|---|---|---|
| 12 | 30 | | 34 | 32 | 3 | 1 | — |
| 13 | 30 | | 34 | 32 | 3 | 1 | — |

\* = parts by weight
Visc. = viscosity in centipoise (cP) at 25° C. using a Brookfield spindle or cone/plate viscometer. Nigrosine Base produced by Orient Chemical Co., Spectra Color Co., and Sunbelt Corporation
2-EHA = 2-ethylhexanoic acid Solvent Brown 12 produced by Sunbelt Corporation. Crystal Violet Base produced by Spectra Color Co.
[a]2-EHA replaced with oleic acid
[b]Solvent Brown 12 replaced with Automate Yellow D dye produced by Morton International or Rohm and Haas Co. from which the xylene solvent is removed and the resulting non-volatile dye dissolved in n-propanol to form a 60 percent, by weight, solution.
[c]Cosolvent is n-propyl acetate.

Samples prepared according to examples 1–6 and 8–9 provided black ink formulations of intense color with a minimum quantity of colorants. The sample prepared according to example 7 exhibited a violet-black shading due to the increased ratio of Crystal Violet Base to Solvent Brown 12. Samples prepared according to examples 10–12 resulted in red shade black dyes. The sample prepared according to example 13 was less violet than other samples but not as blue-black as commercially available Unisol™ Black 1410 (United Color Manufacturing Co.).

We claim:

1. A black, alcohol soluble dye composition comprising:
   a) from 20 to 45 percent, by weight, of a propanol solvent selected from n-propanol, isopropanol, or a mixture thereof;
   b) from 30 to 35 percent, by weight, of Nigrosine Base;
   c) from 20 to 40 percent, by weight, of one or more ($C_7$–$C_{20}$) straight or branched chain, saturated or unsaturated carboxylic acids;
   d) from 1 to 6 percent, by weight of a dye selected from the group consisting of C.I. Solvent Brown 12 dye; a yellow dye having the formula:

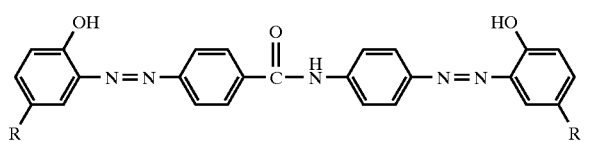

wherein each R is independently a ($C_6$–$C_{12}$) alkyl; and mixtures thereof; and
   e) from 1 to 3 percent, by weight, of a Violet Base selected from the group consisting of Crystal Violet Base, Methyl Violet Base, or mixtures thereof.

2. The composition of claim 1 wherein:
   a) the propanol solvent is n-propanol;
   b) the carboxylic acid is 2-ethylhexanoic acid; and
   c) the Violet Base is Crystal Violet Base.

3. The composition of claim 1 wherein the propanol solvent comprises 30 to 45 percent, by weight, of the composition.

4. The composition of claim 1 wherein the Nigrosine Base comprises 32 to 34 percent, by weight, of the composition.

5. The composition of claim 1 wherein the carboxylic acid comprises 23 to 26 percent, by weight, of the composition.

6. The composition of claim 1 wherein the dye comprises 2 to 3 percent, by weight, of the composition.

7. The composition of claim 1 further comprising one or more components selected from the group consisting of pH adjusters, rheology modifiers, antioxidants, thixotropic agents, plasticizers, conductive agents, additional pigments, cap-off additives, and additional dyes.

8. The composition of claim 1 comprising:
   a) from 39 to 41 percent, by weight, of n-propanol;
   b) from 32 to 33 percent, by weight, of Nigrosine Base;
   c) from 23 to 26 percent, by weight, of 2-ethylhexanoic acid
   d) from 2 to 3 percent, by weight, of C.I. Solvent Brown 12 dye; and
   e) from 1 to 1.5 percent, by weight, of Crystal Violent Base.

9. The composition of claim 1 further comprising 0 to 5 percent, by weight of an ester solvent.

10. A method for producing the composition of claim 1 comprising the steps of:
    a) adding the Nigrosine Base in portions to the propanol, with agitation, until complete wetting out of the Nigrosine Base;
    b) adding the carboxylic acid;
    c) adding the dye and the Violet Base;
    d) heating the mixture to a temperature of from 80 to 85° C. for approximately one hour; and
    e) cooling the mixture to a temperature of from 50 to 60° C.

11. The composition of claim 1 wherein the carboxylic acid is a $C_8$–$C_{18}$ carboxylic acid.

12. The composition of claim 11 wherein the carboxylic acid is a $C_8$–$C_{10}$ carboxylic acid.

13. The composition of claim 12 wherein the carboxylic acid is a $C_8$ carboxylic acid.

14. The composition of claim 9 wherein the cosolvent, when used, is selected from the group consisting of n-propyl acetate and ethyl acetate.

15. The method according to claim 10 further comprising heating the propanol to from about 50° C. to about 60° C. prior to adding the Nigrosine Base.

16. The method according to claim 10 further comprising adjusting the concentration of the composition with additional propanol.

17. The method according to claim 10 further comprising filtering the mixture to remove any particulate materials.

* * * * *

UNITED STATES PATENT AND TRADEMARK OFFICE
CERTIFICATE OF CORRECTION

PATENT NO. : 6,666,897 B2
DATED : December 23, 2003
INVENTOR(S) : Alejandro Zimin, Sr and Michael R. Friswell It is certified that error appears in the above-identified patent and that said Letters Patent is hereby corrected as shown below:

<u>Title page,</u>
Insert item:
-- [73]   Assignee:  Sunbelt Corporation
                    Rock Hill, SC --.

<u>Column 6,</u>
Line 27, "solvent" should read -- cosolvent --.

Signed and Sealed this

Eleventh Day of May, 2004

JON W. DUDAS
*Acting Director of the United States Patent and Trademark Office*